United States Patent
Marumoto

(10) Patent No.: US 7,985,481 B2
(45) Date of Patent: *Jul. 26, 2011

(54) INTERMEDIATE FILM FOR LAMINATED GLASS AND LAMINATED GLASS

(75) Inventor: Tadashi Marumoto, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/679,249

(22) PCT Filed: Oct. 29, 2008

(86) PCT No.: PCT/JP2008/069659
§ 371 (c)(1),
(2), (4) Date: Mar. 19, 2010

(87) PCT Pub. No.: WO2009/057645
PCT Pub. Date: May 7, 2009

(65) Prior Publication Data
US 2010/0233493 A1    Sep. 16, 2010

(30) Foreign Application Priority Data

Oct. 31, 2007    (JP) ................................ 2007-283227

(51) Int. Cl.
*B32B 17/10* (2006.01)
*C08K 5/10* (2006.01)

(52) U.S. Cl. ......... 428/436; 428/437; 428/524; 524/318

(58) Field of Classification Search .................. 428/436, 428/437, 524; 524/318
See application file for complete search history.

(56) References Cited

U.S. PATENT DOCUMENTS

| 4,563,296 A | 1/1986 | Gomez |
| 6,887,577 B1 | 5/2005 | Keller et al. |
| 2009/0305058 A1 | 12/2009 | Marumoto |

FOREIGN PATENT DOCUMENTS

| JP | 60-60149 A | 4/1985 |
| JP | 10-338521 A | 12/1998 |
| JP | 2000-281934 A | 10/2000 |
| JP | 2005-281074 A | 10/2005 |
| WO | WO-01/19747 A1 | 3/2001 |
| WO | WO-01/42158 A1 | 6/2001 |
| WO | WO-2007/125868 A1 | 11/2007 |

OTHER PUBLICATIONS

International Search Report for the Application No. PCT/JP2008/069659 mailed Dec. 16, 2008.
International Preliminary Report on Patentability for Application No. PCT/JP2008/069659 mailed Jun. 10, 2010.

*Primary Examiner* — D. S Nakarani
(74) *Attorney, Agent, or Firm* — Cheng Law Group, PLLC

(57) ABSTRACT

The present invention provides an interlayer for a laminated glass, which contains a polyvinyl acetal resin, and can be easily bonded to a glass sheet to form a highly transparent laminated glass. And the present invention provides a laminated glass using the interlayer. The interlayer for a laminated glass contains 100 phr of a polyvinyl acetal resin and 42 to 60 phr of a plasticizer, wherein the plasticizer is unsaturated fatty acid alkyl ester having 16 to 20 carbon atoms.

8 Claims, No Drawings

INTERMEDIATE FILM FOR LAMINATED GLASS AND LAMINATED GLASS

TECHNICAL FIELD

The present invention relates to an interlayer containing a polyvinyl acetal resin for a laminated glass. And more specifically the present invention relates to an interlayer for a laminated glass which can be easily bonded to a glass to form a highly transparent laminated glass. The present invention also relates to a laminated glass obtained by using the interlayer.

BACKGROUND ART

A laminated glass is widely used as window glasses for automobiles, for railroad car, for aircrafts, for ships, for buildings and for many others, because the laminated glass can contribute to safety. There is little scattering of glass fragments when an impact out of the outside is applied to the laminated glass.

The laminated glass is made of at least a pair of sheet glasses, and an interlayer which is interposed between the pair of sheet glasses. For example, a plasticized polyvinyl acetal resin film, an ethylene-vinyl acetate copolymer resin film, an ethylene-acrylic copolymer resin film, a polyurethane resin film, a polyurethane resin film containing sulfur, and a polyvinyl alcohol resin film are generally used as the interlayer for the laminated glass.

The Patent Document 1 discloses a film formed of a plasticized polyvinyl butyral which is plasticized by a multiester of an alcohol having 2-4 hydroxyl groups and $C_{16}$-$C_{20}$ unsaturated fatty acid having a hydroxyl group bonded to an oxygen molecule. In the Patent Document 1, the interlayer for a laminated glass includes, a monoester component of a glycol and a $C_{16}$-$C_{20}$ unsaturated fatty acid having a hydroxyl group bonded to an oxygen molecule in addition to the above multiester component. The Patent Document 1 describes that the total amount of a mixed plasticizer in the interlayer should be 10-55 phr on a weight basis to 100 phr of PVB resin.

The Patent Document 1 describes that, when a laminated glass is prepared by using the said plasticized polyvinyl butyral film, an adhesive strength in a peeling test is proper, and penetration resistance of the laminated glass is excellent over a wide range of temperature.

The Patent Document 2 discloses an interlayer containing 50-80 weight % of PVB (acetalized polyvinyl alcohol) resin and 20-50 weight % of a softener. In the interlayer described in the Patent Document 2, 30-70 weight % of the softener is composed of polyalkylene glycols represented by the following formula (A1) to (A6) or the derivatives thereof.

$$HO\text{---}(R\text{---}O)_n\text{---}H \quad (A1)$$

In the formula (A1), R is an alkylene group and n>5

$$HO\text{---}(CH_2\text{---}CH_2\text{---}O)_n\text{---}(CH_2\text{---}CH(CH_3)\text{---}O)_m\text{---}H \quad (A2)$$

In the formula (A2), n>2, m>3 and (n+m)<25

$$R_1O\text{---}(CH_2\text{---}CH_2\text{---}O)_n\text{---}(CH_2\text{---}CH(CH_3)\text{---}O)_m\text{---}H \quad (A3)$$

$$HO\text{---}(CH_2\text{---}CH_2\text{---}O)_n\text{---}(CH_2\text{---}CH(CH_3)O)_m\text{---}R_1 \quad (A4)$$

In the formula (A3) or (A4), n>2, m>3, (n+m)<25 and $R_1$ is an organic group $$R_1\text{---}O\text{---}(R_2\text{---}O)_n\text{---}H \quad (A5)$$

In the formula (A5), $R_2$ is an alkylene group, n≧2 and $R_1$ is an organic group $$R_1\text{---}O\text{---}(R_2\text{---}O)_n\text{---}R_3 \quad (A6)$$

In the formula (A6), $R_2$ is an alkylene group, n>5, and $R_1$ and $R_3$ are organic groups Since the interlayer described in the Patent Document 2 contains the specific compound as the softener in the specific ratio, sound insulating property can be obtained for the laminated glass obtained by using the interlayer.

Patent Document 1: JP 60-60149 A
Patent Document 2: WO 01/19747 A1

DISCLOSURE OF THE INVENTION

In a manufacturing of a laminated glass, an autoclave treatment, which is conventionally performed at a high temperature under a high pressure, is usually used in order to obtain a transparent laminated glass. The autoclave treatment enables the interlayer to be bonded to glasses in the Patent Document 1 or the Patent Document 2, whereby a transparent laminated glass can be obtained.

However, the autoclave treatment requires a high temperature and a high pressure in order to bond the interlayer to glasses in the Patent Document 1 or the Patent Document 2. The autoclave treatment requires such a high temperature and pressure as 1.5 MPa at 140° C. for 20 minutes. Large and expensive autoclave equipment is required, which ends up in an increase in high production cost of a laminated glass.

The object of the present invention is to provide an interlayer for a laminated glass, which can be easily bonded to a glass to form a laminated glass. The laminated glass of the present invention has excellent transparency. And another object of the present invention is to provide a laminated glass using the said interlayer.

The present invention can provide an interlayer for a laminated glass which contains 100 phr of a polyvinyl acetal resin and 42-60 phr of a plasticizer on a weight basis. The plasticizer is an unsaturated fatty acid alkyl ester which has 16 to 20 carbon atoms.

Specifically, the unsaturated fatty acid alkyl ester can be a ricinoleic acid alkyl ester.

Specifically, the unsaturated fatty acid alkyl ester can be an oleic acid alkyl ester.

Specifically, the unsaturated fatty acid alkyl ester can be a linoleic acid alkyl ester.

The laminated glass in the present invention has at least two transparent glass sheets, and the said interlayer, which is interposed between the two transparent glass sheets.

EFFECT OF THE INVENTION

Since the interlayer of the present invention contains 100 phr of a polyvinyl acetal resin and 42-60 phr of a plasticizer on a weigh basis, and the plasticizer is an unsaturated fatty acid alkyl ester which has 16 to 20 carbon atoms, it is unnecessary to perform an autoclave treatment for manufacturing of a laminated glass. The interlayer and the sheet glass can be easily bonded to each other by an alternative method without an autoclave method. For example, one of the alternative methods is an evacuated bag method, where an interlayer and two sheets of glasses are processed in an evacuated rubber bag at lower temperature and under lower pressure than an autoclave treatment. It is possible to obtain a transparent laminated glass because no bubbles remain at a bonding interface between the interlayer and the sheet glass. Accordingly, since a high temperature and a high pressure is unnecessary, large and expensive autoclave equipment is unnecessary, which contributes to lower production cost than an autoclave method. Besides, a laminated glass having excellent penetration resistance can be obtained even under a high temperature environment.

When the unsaturated fatty acid alkyl ester is ricinoleic acid alkyl ester, the interlayer and the sheet glass can be bonded to each other even under the mild conditions, and thus a transparent laminated glass without remaining bubble can be obtained.

When the unsaturated fatty acid alkyl ester is oleic acid alkyl ester, the interlayer and the sheet glass are bonded to each other even under mild conditions, and thus a transparent laminated glass without remaining bubble can be obtained.

When the unsaturated fatty acid alkyl ester is linoleic acid alkyl ester, the interlayer and the sheet glass are bonded to each other even under mild conditions, and thus a transparent laminated glass without remaining bubble can be obtained.

Since, in the laminated glass of the present invention, the interlayer of the present invention is interposed between at least two transparent glass sheets, the sheet glass and the interlayer are firmly bonded to each other, and thus a transparent laminated glass without remaining bubble can be obtained.

BEST MODE FOR CARRYING OUT THE INVENTION

The present invention will now be described in detail.

The interlayer of the present invention contains a polyvinyl acetal resin and a plasticizer.

The polyvinyl acetal resin is prepared by acetalizing a polyvinyl acetal resin (PVA) with an aldehyde.

The method for preparing a polyvinyl acetal resin is not particularly limited. For example, a polyvinyl alcohol resin is dissolved in warm or hot water to obtain an aqueous solution. The resultant aqueous solution is maintained at a predetermined temperature of about 0 to 95° C. and an aldehyde and an acid catalyst are added thereto, and then an acetalization reaction is allowed to proceed while stirring. Next, the reaction temperature is raised for aging, thereby completing the reaction. Then, neutralization, washing with water and drying steps are carried out. Thus, a powdered polyvinyl acetal resin can be obtained.

The polyvinyl alcohol resin used for the preparation of a polyvinyl acetal resin is not particularly limited. The average polymerization degree is preferably from 500 to 5,000, and more preferably from 1,000 to 3,000. When the average polymerization degree is 500 or more, the strength of the interlayer increases and the penetration resistance of the resulting laminated glass is improved. When the average polymerization degree is 5,000 or less, it becomes easy to form the interlayer. Furthermore, since the strength of the interlayer does not become too large, the penetration resistance of the resulting laminated glass is improved.

In addition, the average polymerization degree of the polyvinyl alcohol resin can be measured, for example, in accordance with JIS K 6726 "Polyvinyl Alcohol Test Method".

The aldehyde used for the preparation of the polyvinyl acetal resin is not particularly limited and includes, for example, aldehyde having 1 to 10 carbon atoms, Specific examples thereof include n-butylaldehyde, isobutylaldehyde, n-valeraldehyde, 2-ethylbutylaldehyde, n-hexylaldehyde, n-octylaldehyde, n-nonylaldehyde, n-decylaldehyde, formaldehyde, acetoaldehyde, and benzaldehyde. These aldehydes can be used alone or in combination thereof. Among these, n-butylaldehyde, n-hexylaldehyde and n-valeraldehyde are preferred, and n-butylaldehyde having 4 carbon atoms is more preferred.

The polyvinyl acetal resin is not particularly limited and includes, for example, a polyvinyl formal resin prepared by reacting a polyvinyl alcohol resin with formaldehyde, a polyvinyl acetal resin in narrow definition which is prepared by reacting a polyvinyl alcohol resin with acetoaldehyde, and a polyvinyl butyral resin prepared by reacting a polyvinyl alcohol resin with n-butylaldehyde. These polyvinyl acetal resins can be used alone or in combination As the polyvinyl acetal resin, the polyvinyl butyral resin (PVB) is used preferably. By using the polyvinyl butyral resin, the interlayer has further enhanced transparency, weather resistance and adhesiveness to the glass.

The acetalization degree of the polyvinyl acetal resin is preferably from 60 to 85% by mol, and more preferably from 63 to 70% by mol. When the acetalization degree is less than 60% by mol, the compatibility of the plasticizer with the polyvinyl acetal resin may be low, and also the glass transition temperature of the interlayer may not sufficiently decrease. Accordingly, the sound insulating property may be insufficient at a low temperature range. When the acetalization degree exceeds 85% by mol, the reaction time required to produce the polyvinyl acetal resin becomes longer, leading to lower production efficiency in some cases.

The amount of acetyl groups in the polyvinyl acetal is preferably from 0.5 to 30% by mol. The amount of acetyl groups is more preferably from 0.5 to 25% by mol, and still more preferably from 0.5 to 20% by mol.

When the amount of acetyl groups is less than 0.5% by mol, the compatibility of the plasticizer with the polyvinyl acetal resin may deteriorate. Further, the glass transition temperature of the resultant polyvinyl acetal resin may not sufficiently decrease. Accordingly, the sound insulating property may not be sufficiently improved at a low temperature range. In the case of making a trial of producing the polyvinyl acetal resin with acetyl groups in an amount of 30% by mol or higher, the reactivity of the polyvinyl alcohol resin with aldehyde may drastically deteriorate.

The sum of the acetalization degree and the amount of acetyl groups is 65% by mol or more in the polyvinyl acetal resin, and more preferably 68% by mol or more. When the sum of the acetalization degree and the amount of acetyl groups is less than 65% by mol, the compatibility with the plasticizer may deteriorate. Further, the glass transition temperature of the resultant polyvinyl acetal resin may not sufficiently decrease. Accordingly, the sound insulating property may not be sufficiently improved at a low temperature range.

Further, the acetalization degree of the polyvinyl actal resin can be calculated by measuring the amount of acetyl groups and the amount of vinyl alcohol in accordance with JIS K 6728 "Polyvinyl Butyral Test Method" and a nuclear magnetic resonance method (NMR), calculating the respective values by mol % using the results, followed by subtracting the values of the amount of acryl groups and the amount of vinyl alcohol by mol % from 100% by mol.

Incidentally, in the case where the polyvinyl acetal resin is the polyvinyl butyral resin, the acetalization degree (butyralization degree) and the amount of acetyl groups are calculated from the results measured by JIS K 6728 "Polyvinyl Butyral Test Method", infrared spectroscopy (IR) and a nuclear magnetic resonance method (NMR).

The interlayer according to the present invention contains 42-60 phr of a plasticizer on a weight basis to 100 phr of the polyvinyl acetal resin, and the plasticizer is an unsaturated fatty acid alkyl ester which has 16 to 20 carbon atoms.

When the content of the plasticizer is less than 42 phr, high temperature and high pressure is necessary to bond the interlayer and sheet glass, in order to improve adhesion between the interlayer and sheet glass. When the content of the plasticizer exceeds 60 phr, the plasticizer will exude from the interlayer. The content of the plasticizer is more preferably from 44 to 57 phr. In this case, penetration resistance of the laminated glass will be high even at a high environmental temperature like at 30° C. The content of the plasticize is particularly preferably from 49 to 55 phr.

Examples of the unsaturated fatty acid alkyl ester having 16 to 20 carbon atoms include ricinoleic acid alkyl esters such as methyl ricinolate, ethyl ricinolate, butyl ricinolate, oleic acid alkyl esters, and linoleic acid alkyl esters. Among these, ricinoleic acid alkyl esters, oleic acid alkyl esters and linoleic acid alkyl esters are preferred, and ricinoleic acid alkyl esters are more preferred due to hydroxyl groups contained in the molecule. In the interlayer containing a ricinoleic acid alkyl ester, oleic acid alkyl ester or linoleic acid alkyl ester in the above ratio, adhesion between the interlayer and sheet glass can be carried out under more mild conditions, and also the laminated glass having more excellent transparency is obtained. The unsaturated fatty acid alkyl ester having 16 to 20 carbon atoms can be used alone or in combination. For example, it is possible to use a mixture of a ricinoleic acid alkyl ester, oleic acid alkyl ester and linoleic acid alkyl ester. When the unsaturated fatty acid alkyl ester having 16 or less carbon atoms is used, the penetration resistance of the laminated glass may deteriorate under the environment of 30°. When the unsaturated fatty acid alkyl ester having 20 or more carbon atoms is used, it is necessary to carry out pressure bonding of the interlayer and sheet glass at a high temperature under a high pressure when the laminated glass is formed in order to improve adhesion between the interlayer and the sheet glass.

The ricinoleic acid alkyl ester is preferably methyl ricinolate, ethyl ricinolate, butyl ricinolate or isopropyl ricinolate, and more preferably methyl ricinolate, ethyl ricinolate or butyl ricinolate. The alkyl group is preferably an alkyl group having 1 to 5 carbon atoms, and more preferably 1 to 3 carbon atoms. The alkyl group may be an alkyl group having a straight chain structure, or an alkyl group having a branch structure.

The oleic acid alkyl ester is preferably methyl oleate, ethyl oleate, butyl oleate or isopropyl oleate, and more preferably methyl oleate, ethyl oleate or butyl oleate. The alkyl group is preferably an alkyl group having 1 to 5 carbon atoms, and more preferably 1 to 3 carbon atoms. The alkyl group may be an alkyl group having a straight chain structure, or an alkyl group having a branch structure.

The linoleic acid alkyl ester is preferably methyl linoleate, ethyl oleate, butyl linoleate or isopropyl linoleate, and more preferably methyl linoleate, ethyl linoleate or butyl linoleate. The alkyl group is preferably an alkyl group having 1 to 5 carbon atoms, and more preferably 1 to 3 carbon atoms. The alkyl group may be an alkyl group having a straight chain structure, or an alkyl group having a branch structure.

The unsaturated fatty acid alkyl ester having 16 to 20 carbon atoms means, for example, an ester compound of unsaturated fatty acid having 16 to 20 carbon atoms and an optional alcohol.

The interlayer according to the present invention may contain other plasticizers (X) other than the above-described plasticizer. Examples of the plasticizer (X) include, but are not limited to, known plasticizers which are commonly used for a polyvinyl acetal resins. For example, basic organic plasticizers such as monobasic organic acid esters and polybasic organic acid esters, and phosphate plasticizer such as organophosphate plasticizers and organophosphorous plasticizers are preferably used. These plasticizers (X) can be used alone or in combination. The plasticizer (X) can be tactfully used depending on the kind of polyvinyl acetal resin, considering the compatibility and other factors.

Examples of the monobasic organic acid ester include, but are not limited to, glycol esters prepared by reaction of glycol, e.g., triethylene glycol or tripropylene glycol, with a monobasic organic acid, e.g., butyric acid, isobutyric acid, caproic acid, 2-ethylbutyric acid, heptanoic acid, heptyl acid, n-octyl acid, 2-ethylhexyl acid, pelargonoic acid (n-nonylic acid) or decyl acid. Among these, monobasic organic acid esters of triethylene glycol, such as triethylene glycol dicaproic acid ester, triethylene glycol di-2-ethylbutyric acid ester, triethylene glycol di-n-octyl acid ester or triethylene glycol di-2-ethylhexyl acid ester, are preferably used.

Examples of the polybasic organic acid ester include, but are not limited to, esters prepared by reaction of a polybasic organic acid, e.g., adipic acid, sebacic acid or azelaic acid, having a straight chain or branched alcohol of 4 to 8 carbon atoms. Among these, dibutyl sebacic acid ester, dioctyl azelaiic acid ester, dibutyl carbitol adipic acid ester or the like are preferably used.

Examples of the organic phosphate plasticizer include, but are not limited to, tributoxyethyl phosphate, isodecylphenyl phosphate and triisopropyl phosphate.

In the present invention, one or more additives can be added, in addition to the essential components, i.e., the polyvinyl acetal resin and plasticizer, as long as the achievement of the object of the present invention is not inhibited. Examples of additives include adhesion imparting agents, coupling agents, surfactants, antioxidants, thermal stabilizers, optical stabilizers, ultraviolet absorbers, colorants, dehydrating agents, defoamers, antistatic agents and flame retardants.

The interlayer of the present invention is obtained by a conventional preparation method of the polyvinyl acetal resin composition, containing essential polyvinyl acetal resin and plasticizer, and some additives to be added if necessary.

In the interlayer, it is preferred that the melt viscosity at 110° C. is 10,000 Pa·s or more and that at 140° C. is 100,000 Pa·s or less. The interlayer having a melt viscosity of 10,000 Pa·s or more at 110° C. and 100,000 Pa·s or less at 140° C. exhibits more excellent adhesion performance.

When the melt viscosity of the interlayer is less than 10,000 Pa·s at 110° C., slips or foams may be generated upon processing into a laminated glass, and thus the handling property may deteriorate. Further, since the strength of the interlayer deteriorates too much, the penetration resistance of the laminated glass may become low. When the melt viscosity of the interlayer exceeds 100,000 Pa·s at 140° C., it may become difficult to form the interlayer in a stable manner. Further, since the strength of the interlayer increases too much, the penetration resistance of the laminated glass may become low.

The thickness of the interlayer is not particularly limited, but it is preferred to be from 0.3 to 2.4 mm. The thickness of the interlayer is more preferably from 0.6 to 2.0 mm. The sound insulating property is more excellent as the thickness of the interlayer increases. However, when the thickness of the interlayer becomes too thick, the thickness of the laminated glass may exceeds the desired thickness. Accordingly, it is preferred that the thickness of the interlayer falls within the above range.

The laminated glass of the present invention is prepared by placing the above-described interlayer of the present invention between at least two sheets of transparent sheet glass, followed by integrating thereof.

The transparent sheet glass includes organic transparent sheet glasses such as a polycarbonate plate and a polymethyl methacrylate plate, let alone the common inorganic transparent sheet glass.

The kind of the sheet glass is not particularly limited, but exemplified by inorganic and organic sheet glasses of every kind, such as a float glass, polished glass, plate glass, song glass, parallel glass, figured glass, armed figure glass and colored sheet glass. The sheet glasses may be used alone, or two or more kinds of sheet glasses may be used in combination. Further, the thickness of the sheet glass is properly selected according to an application and purpose, and thus it is not particularly limited.

The manufacturing of the laminated glass is generally conducted in the manner as follows.

For example, the interlayer of the present invention is placed between two sheets of transparent sheet glass to obtain a sandwich form. The sandwich form is placed in a rubber bag, and a preliminary bonding process of the sheet glass and the interlayer is carried out at a temperature of about 70 to 110° C. and under reduced pressure for deaeration. Then, using an autoclave, the interlayer is bonded to the sheet glass by the autoclave treatment, which applies heat and pressure for 20 minutes under such conditions as at temperature of about 140 to 150° C. and under pressure of about 0.98 to 1.47 MPa. The laminated glass is obtained in this manner.

In the interlayer of the present invention, the content of particular plasticizer is proper, and thus it is not always necessary to use the autoclave treatment at a high temperature and under a high pressure, as was conventionally done in the manufacturing of laminated glasses. Even without the autoclave treatment, the interlayer and the sheet glass are able to be bonded firmly to each other and thus a transparent laminated glass free from remaining bubbles on the bonding interface between the interlayer and sheet glass can be obtained. Nevertheless, a conventional autoclave treatment can be used if necessary.

Conventionally, the autoclave treatment requires a high temperature and a high pressure. In order to perform the autoclave treatment, large and expensive equipment is necessary, leading to an increase in production cost of the laminated glass. On the other hand, the interlayer of the present invention does not require high pressure and high temperature for obtaining a transparent laminated glass without remaining bubble.

When the laminated glass is manufactured by using the interlayer of the present invention, for example, the interlayer and the sheet glass are laminated and placed in a rubber bag, and the sheet glass and interlayer are preliminarily bonded to each other under vacuum deaeration under a reduced pressure of about 0.016 to 0.020 MPa at a temperature of about 70 to 90° C. Then, the laminate is allowed to stand under a reduced pressure of 0.016 to 0.020 MPa at a temperature of about 100 to 140° C. for 15 to 60 minutes. In other words, large and expensive autoclave equipment needed for achieving a high temperature and high pressure is unnecessary, and thus the production cost of the laminated glass can be lower.

The present invention will be described clearly by the way of the specific Examples and Comparative Examples below. The present invention is not limited to the following Examples.

Synthesis of Polyvinyl Butyral Resin A 2,890 g of ion exchange water and 275 g of polyvinyl alcohol having an average polymerization degree of 1,700 and a saponification degree of 98.9% by mol were charged in a reactor equipped with a stirrer, and were dissolved with stirring with heat applied to obtain a solution. After the solution was adjusted at 12° C., 201 g of an aqueous 35 wt % solution of hydrochloric acid and 148 g of n-butylaldehyde were added thereto as catalysts, and the temperature of the solution was maintained at 12° C. to precipitate the reaction product. Then, the solution was maintained at 45° C. for 3 hours, and the reaction was completed. The reaction product was washed with excessive water, neutralized with an aqueous solution of sodium hydroxide, washed with excessive water furthermore for 2 hours and dried to obtain a white powder of a polyvinyl butyral resin A. The resultant polyvinyl butyral resin had an average polymerization degree of 1,700, a butyralization degree of 65% by mol, and an amount of residual acetyl groups of 1% by mol.

EXAMPLE 1

42 phr of methyl ricinolate was added as a plasticizer to the 100 phr of polyvinyl butyral resin A. It was uniformly melt-kneaded with a mixing roll, pressed at 150° C. for 30 minutes using a molding machine, followed by letting it go through an embossing roll. Through these processes, an interlayer, which is 1.3 mm in thickness and has an dark linear emboss pattern (hereinafter, described as "embossed line") formed on the surface, and whose ten-point average height Rz on the surface measured in accordance with JIS B0601:1994 was 30 μm, was prepared.

EXAMPLES 2 TO 60, AND COMPARATIVE EXAMPLES 1 TO 20

In Examples 2 to 60 and Comparative Examples 1 to 20, the interlayer was prepared in the same manner as in Example 1, except for changing a kind of the plasticizer and combination ratio as shown in the following Table 1 to 10.

The plasticizer exuded from the interlayer in Comparative Examples 2, 4, 6, 8, 10, 12, 14, 16, 18 and 20. the plasticizer did not exuded from the interlayer in Examples 1 to 60 and Comparative Examples 1, 3, 5, 7, 9, 11, 13, 15, 17 and 19.

(Evaluation)

(1) Remaining Bubbles and Remaining Embossed Line

The interlayer obtained in Examples and Comparative Examples was placed between two sheets of transparent curved glasses (30 cm length, 30 cm width) to obtain a sandwich form. The sandwich form was placed in a rubber bag, and the sheet glass and the interlayer were preliminary bonded to each other under vacuum deaeration at a temperature of 90° C. and under a reduced pressure of 0.018 MPa. Then, the sandwich form was let stand under a reduced pressure of 0.018 MPa at a temperature of 100° C. for 20 minutes, so as to prepare a curved laminated glass. In each Example and Comparative Example, 3 laminated glasses were prepared, respectively.

As to the resultant three sheets of laminated glass, existence of remaining bubbles on the bonding surface between the interlayer and the sheet glass, and existence of remaining embossed line were counted, and then evaluated on the basis of the following evaluation criteria.

[Evaluation Criteria for Remaining Bubbles]
A: All of three laminated glasses were transparent without remaining bubbles when visually observed using a loupe having a magnifying power ×20.
B: All of three laminated glasses were transparent without remaining bubbles when visually observed.

C: Remaining bubbles were slightly observed in some of three laminated glasses when visually observed.
D: Remaining bubbles were clearly observed in 1 or more of three laminated glasses when visually observed.
[Evaluation Criteria for Remaining Embossed Line]
A: All of three laminated glasses were transparent without remaining embossed line when visually observed a loupe having a magnifying power ×20.
B: All of three laminated glasses were transparent without remaining embossed line when visually observed.
C: Remaining embossed line in some of three laminated glasses were slightly observed when visually observed.
D: Remaining embossed line were clearly observed in one or more of three laminated glasses when visually observed.

(2) Evaluation on Penetration Resistance Performance

In accordance with JIS R 3212, evaluation of the penetration resistance performance was evaluated at 30° C. for the resultant curved laminated glasses. After disposing the curved laminated glass with the convex portion upwards and the concave portion downwards, a steel ball having mass of 2260 g and diameter of about 82 mm was dropped onto the center of the laminated glass (measuring 30 cm length, 30 cm width) from a height of 4 m. The evaluation was performed on each of 3 laminated glasses. The penetration resistance performance was rated on the basis of the following evaluation criteria.

[Evaluation Criteria for Penetration Resistance Performance at 30° C.]
A: The steel ball did not penetrate two or more laminated glasses out of three sheets of the laminated glass.
B: The steel ball did not penetrate a single laminated glass out of three sheets of the laminated glass.
C: The steel ball penetrated all of three laminated glasses.

The results are shown in the following Tables 1 to 10.

TABLE 1

| | | | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|---|---|
| Mixing Ratio | Polyvinyl Butyral | phr | 100 | 100 | 100 | 100 | 100 | 100 | 100 | 100 |
| | Methyl Ricinolate | phr | 42 | 44 | 49 | 55 | 57 | 60 | 40 | 65 |
| Evaluation | Remaining Bubbles | | Δ | ◎ | ◎ | ◎ | ◎ | ◎ | X | ◎ |
| | Remaining Embossed Line | | Δ | ◎ | ◎ | ◎ | ◎ | ◎ | X | ◎ |
| | Penetration Resistance Performance (30° C.) | | ○ | ○ | ○ | ○ | Δ | Δ | ○ | Δ |
| | Surface Condition | | — | — | — | — | — | — | — | Exuding of Plasticizer |

TABLE 2

| | | | Ex. 7 | Ex. 8 | Ex. 9 | Ex. 10 | Ex. 11 | Ex. 12 | Comp. Ex. 3 | Comp. Ex. 4 |
|---|---|---|---|---|---|---|---|---|---|---|
| Mixing Ratio | Polyvinyl Butyral | phr | 100 | 100 | 100 | 100 | 100 | 100 | 100 | 100 |
| | Ethyl Ricinolate | phr | 42 | 44 | 49 | 55 | 57 | 60 | 40 | 65 |
| Evaluation | Remaining Bubbles | | Δ | ○ | ○ | ◎ | ◎ | ◎ | X | ◎ |
| | Remaining Embossed Line | | Δ | ○ | ◎ | ◎ | ◎ | ◎ | X | ◎ |
| | Penetration Resistance Performance (30° C.) | | ○ | ○ | ○ | ○ | Δ | Δ | ○ | Δ |
| | Surface Condition | | — | — | — | — | — | — | — | Exuding of Plasticizer |

TABLE 3

| | | | Ex. 13. | Ex. 14 | Ex. 15 | Ex. 16 | Ex. 17 | Ex. 18 | Comp. Ex. 5 | Comp. Ex. 6 |
|---|---|---|---|---|---|---|---|---|---|---|
| Mixing Ratio | Polyvinyl Butyral | phr | 100 | 100 | 100 | 100 | 100 | 100 | 100 | 100 |
| | Butyl Ricinolate | phr | 42 | 44 | 49 | 55 | 57 | 60 | 40 | 65 |
| Evaluation | Remaining Bubbles | | Δ | ○ | ○ | ◎ | ◎ | ◎ | X | ◎ |
| | Remaining Embossed Line | | Δ | ○ | ◎ | ◎ | ◎ | ◎ | X | ◎ |
| | Penetration Resistance Performance (30° C.) | | ○ | ○ | ○ | ○ | Δ | Δ | ○ | Δ |
| | Surface Condition | | — | — | — | — | — | — | — | Exuding of Plasticizer |

TABLE 4

| | | | Ex. 19 | Ex. 20 | Ex. 21 | Ex. 22 | Ex. 23 | Ex. 24 | Comp. Ex. 7 | Comp. Ex. 8 |
|---|---|---|---|---|---|---|---|---|---|---|
| Mixing Ratio | Polyvinyl Butyral | phr | 100 | 100 | 100 | 100 | 100 | 100 | 100 | 100 |
| | Isopropyl Ricinolate | phr | 42 | 44 | 49 | 55 | 57 | 60 | 40 | 65 |
| Evaluation | Remaining Bubbles | | Δ | Δ | Δ | ○ | ○ | ○ | X | ○ |
| | Remaining Embossed Line | | Δ | Δ | Δ | ○ | ○ | ○ | X | ○ |
| | Penetration Resistance Performance (30° C.) | | ○ | ○ | ○ | ○ | ○ | Δ | ○ | Δ |
| | Surface Condition | | — | — | — | — | — | — | — | Exuding of Plasticizer |

TABLE 5

| | | | Ex. 25 | Ex. 26 | Ex. 27 | Ex. 28 | Ex. 29 | Ex. 30 | Comp. Ex. 9 | Comp. Ex. 10 |
|---|---|---|---|---|---|---|---|---|---|---|
| Mixing Ratio | Polyvinyl Butyral | phr | 100 | 100 | 100 | 100 | 100 | 100 | 100 | 100 |
| | Methyl Oleate | phr | 42 | 44 | 49 | 55 | 57 | 60 | 40 | 65 |
| Evaluation | Remaining Bubbles | | Δ | Δ | Δ | ○ | ○ | ○ | X | ○ |
| | Remaining Embossed Line | | Δ | Δ | ○ | ○ | ○ | ○ | X | ○ |
| | Penetration Resistance Performance (30° C.) | | ○ | ○ | ○ | ○ | Δ | Δ | ○ | Δ |
| | Surface Condition | | — | — | — | — | — | — | — | Exuding of Plasticizer |

TABLE 6

| | | | Ex. 31 | Ex. 32 | Ex. 33 | Ex. 34 | Ex. 35 | Ex. 36 | Comp. Ex. 11 | Comp. Ex. 12 |
|---|---|---|---|---|---|---|---|---|---|---|
| Mixing Ratio | Polyvinyl Butyral | phr | 100 | 100 | 100 | 100 | 100 | 100 | 100 | 100 |
| | Ethyl Oleate | phr | 42 | 44 | 49 | 55 | 57 | 60 | 40 | 65 |
| Evaluation | Remaining Bubbles | | Δ | Δ | Δ | ○ | ○ | ○ | X | ○ |
| | Remaining Embossed Line | | Δ | Δ | Δ | ○ | ○ | ○ | X | ○ |
| | Penetration Resistance Performance (30° C.) | | ○ | ○ | ○ | ○ | Δ | Δ | ○ | Δ |
| | Surface Condition | | — | — | — | — | — | — | — | Exuding of Plasticizer |

TABLE 7

| | | | Ex. 37 | Ex. 38 | Ex. 39 | Ex. 40 | Ex. 41 | Ex. 42 | Comp. Ex. 13 | Comp. Ex. 14 |
|---|---|---|---|---|---|---|---|---|---|---|
| Mixing Ratio | Polyvinyl Butyral | phr | 100 | 100 | 100 | 100 | 100 | 100 | 100 | 100 |
| | Butyl Oleate | phr | 42 | 44 | 49 | 55 | 57 | 60 | 40 | 65 |
| Evaluation | Remaining Bubbles | | Δ | Δ | Δ | Δ | ○ | ○ | X | ○ |
| | Remaining Embossed Line | | Δ | Δ | Δ | ○ | ○ | ○ | X | ○ |
| | Penetration Resistance Performance (30° C.) | | ○ | ○ | ○ | ○ | ○ | Δ | ○ | Δ |
| | Surface Condition | | — | — | — | — | — | — | — | Bleed-out of Plasticizer |

TABLE 8

|  |  |  | Ex. 43 | Ex. 44 | Ex. 45 | Ex. 46 | Ex. 47 | Ex. 48 | Comp. Ex. 15 | Comp. Ex. 16 |
|---|---|---|---|---|---|---|---|---|---|---|
| Mixing Ratio | Polyvinyl Butyral | phr | 100 | 100 | 100 | 100 | 100 | 100 | 100 | 100 |
|  | Methyl Linolate | phr | 42 | 44 | 49 | 55 | 57 | 60 | 40 | 65 |
| Evaluation | Remaining Bubbles |  | Δ | Δ | Δ | ○ | ○ | ○ | X | ○ |
|  | Remaining Embossed Line |  | Δ | Δ | Δ | ○ | ○ | ○ | X | ○ |
|  | Penetration Resistance Performance (30° C.) |  | ○ | ○ | ○ | ○ | ○ | Δ | ○ | Δ |
|  | Surface Condition |  | — | — | — | — | — | — | — | Bleed-out of Plasticizer |

TABLE 9

|  |  |  | Ex. 49 | Ex. 50 | Ex. 51 | Ex. 52 | Ex. 53 | Ex. 54 | Comp. Ex. 17 | Comp. Ex. 18 |
|---|---|---|---|---|---|---|---|---|---|---|
| Mixing Ratio | Polyvinyl Butyral | phr | 100 | 100 | 100 | 100 | 100 | 100 | 100 | 100 |
|  | Ethyl Linolate | phr | 42 | 44 | 49 | 55 | 57 | 60 | 40 | 65 |
| Evaluation | Remaining Bubbles |  | Δ | Δ | Δ | Δ | ○ | ○ | X | ○ |
|  | Remaining Embossed Line |  | Δ | Δ | Δ | ○ | ○ | ○ | X | ○ |
|  | Penetration Resistance Performance (30° C.) |  | ○ | ○ | ○ | ○ | ○ | Δ | ○ | Δ |
|  | Surface Condition |  | — | — | — | — | — | — | — | Bleed-out of Plasticizer |

TABLE 10

|  |  |  | Ex. 55 | Ex. 56 | Ex. 57 | Ex. 58 | Ex. 59 | Ex. 60 | Comp. Ex. 19 | Comp. Ex. 20 |
|---|---|---|---|---|---|---|---|---|---|---|
| Mixing Ratio | Polyvinyl Butyral | phr | 100 | 100 | 100 | 100 | 100 | 100 | 100 | 100 |
|  | Butyl Linolate | phr | 42 | 44 | 49 | 55 | 57 | 60 | 40 | 65 |
| Evaluation | Remaining Bubbles |  | Δ | Δ | Δ | Δ | ○ | ○ | X | ○ |
|  | Remaining Embossed Line |  | Δ | Δ | Δ | Δ | ○ | ○ | X | ○ |
|  | Penetration Resistance Performance (30° C.) |  | ○ | ○ | ○ | ○ | ○ | Δ | ○ | Δ |
|  | Surface Condition |  | — | — | — | — | — | — | — | Bleed-out of Plasticizer |

The invention claimed is:

1. An interlayer for a laminated glass, comprising 100 phr of a polyvinyl acetal resin and 42 to 60 phr of a plasticizer on weight basis, wherein the plasticizer is unsaturated fatty acid alkyl ester having 16 to 20 carbon atoms.

2. The interlayer for a laminated glass according to claim 1, wherein the unsaturated fatty acid alkyl ester is ricinoleic acid alkyl ester.

3. The interlayer for a laminated glass according to claim 1, wherein the unsaturated fatty acid alkyl ester is oleic acid alkyl ester.

4. The interlayer for a laminated glass according to claim 1, wherein the unsaturated fatty acid alkyl ester is linoleic acid alkyl ester.

5. A laminated glass comprising at least two transparent glass sheets, and the interlayer for a laminated glass according to claim 1 which is bonded to the at least two transparent glass sheets while being interposed between them.

6. A laminated glass comprising at least two transparent glass sheets, and the interlayer for a laminated glass according to claim 2 which is bonded to the at least two transparent glass sheets while being interposed between them.

7. A laminated glass comprising at least two transparent glass sheets, and the interlayer for a laminated glass according to claim 3 which is bonded to the at least two transparent glass sheets while being interposed between them.

8. A laminated glass comprising at least two transparent glass sheets, and the interlayer for a laminated glass according to claim 4 which is bonded to the at least two transparent glass sheets while being interposed between them.

* * * * *